Sept. 28, 1937.                G. CARTIGNY                2,094,350
                            FILTERING APPARATUS
                            Filed June 23, 1936
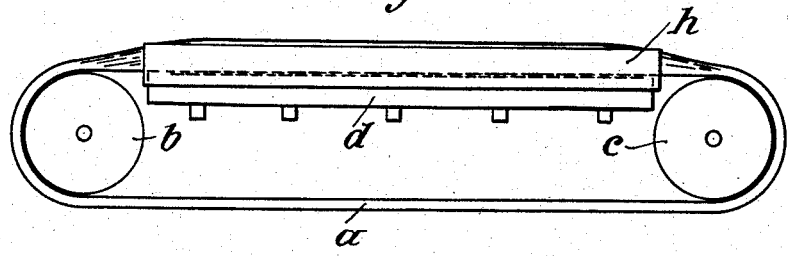
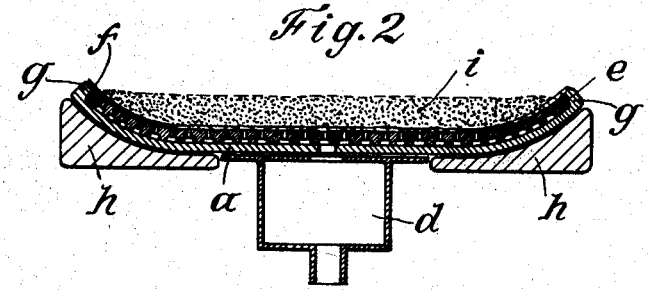
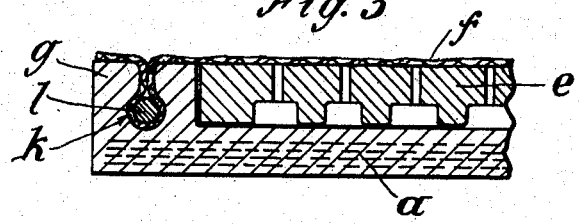
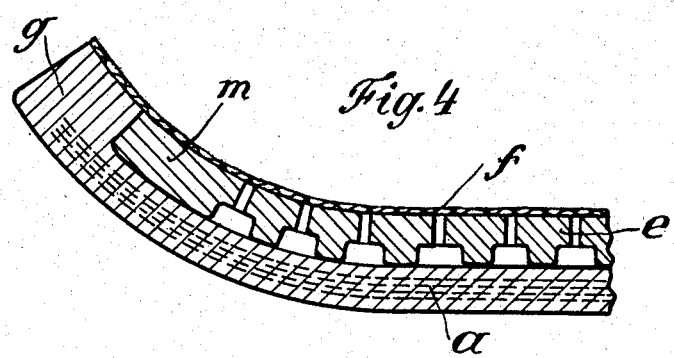
Inventor:
Georges Louis Désiré Cartigny
By
his Attorney.

Patented Sept. 28, 1937

2,094,350

UNITED STATES PATENT OFFICE 2,094,350

FILTERING APPARATUS

Georges Louis Desiré Cartigny, Rieme-Gent, Belgium, assignor to Aktiebolaget Kemiska Patenter, Landskrona, Sweden, a Swedish company Application June 23, 1936, Serial No. 86,759
In France June 26, 1935

5 Claims. (Cl. 210—197)

This invention relates to apparatus for filtering mixtures of solid and liquid substances.

For filtering mixtures of solid and liquid substances and for washing the filter cake it is known to employ apparatus in which an endless elastic carrier band is carried by means of guide rollers over one or more suction boxes which are narrower than the band, and the actual filtering medium, for example filter cloth, is arranged on the carrier band.

In a known apparatus of this kind (see for example the French Specification No. 760,349) the endless carrier band of elastic material, for example rubber, moves in a horizontal plane and is provided with openings, and is covered with a suitable filtering medium, for example filter cloth. The carrier band is guided in such a way that its lower surface passes over and automatically makes tight contact with the smooth and even edges of one or more suction boxes, which are arranged below and are open to the band, in which a vacuum is maintained. The filtrates are drawn off separately or in common into the suction boxes, while the filter cake which is formed on the filtering medium is removed on the return movement of the endless band, being preferably thrown off automatically. In one particular form of such apparatus, the elastic carrier band is provided with upstanding reinforcing edges within which the filtering medium is disposed and between which there is preferably room for the whole or at least a part of the filter cake. According to a further form of construction there is arranged between the carrier band and the filtering medium a separate endless band which is also elastic and is porous or perforated or otherwise made permeable in a vertical direction. This intermediate band may be provided on its inner surface also with ribs, bars or knobs or other projections in order to form cells or cavities between the carrier band and intermediate band and thereby uniformly to distribute the vacuum over the under surface of the filtering medium. When elastic carrier bands with upstanding reinforcing edges are employed, the intermediate band and the filtering medium which rests on it lie between these upstanding edges between which also the filter cake is then formed.

According to further forms of construction, the suction boxes are arranged so as to be movable or adjustable in the vertical and/or in the horizontal plane. Also, in addition to or instead of this adjustment, transverse partitions may be arranged inside the suction box, these partitions being adjustable or hinged so that the length of the various washing periods can be regulated as desired. Further, there may be arranged above the band which runs over the suction box and on the surface of the filter cake which is formed, sliding or rolling members, for example separating walls, rollers or the like, which separate the various washing liquors one from another.

I have found in practical operation that even with the use of conveyor bands having upstanding reinforcing edges, it is frequently difficult to prevent part of the filter cake from escaping into the suction box at the places where the edges of the filter medium or intermediate belt bears against the reinforcing edge, and thus adversely affecting the filtering and washing action.

The object of the present invention is greatly to improve this type of apparatus for filtering mixtures of solids and fluids and for washing the filter cake, and to obviate the aforesaid difficulties which are encountered in the operation of such apparatus. In accordance with my invention, I accomplish this object by making the upstanding reinforcing edges of the conveyer band of a height such that they project freely from the outer surface of the band on which the intermediate band rests to a distance at least substantially equal to the thickness of the intermediate band. I also make the filtering medium wider than the intermediate band and arrange it on the common surface formed by the intermediate band and the upper surface of the reinforcing edges constructed in the manner just defined. Furthermore, the lateral parts of the conveyor band projecting beyond the suction box or boxes are troughed in cross section by being upwardly curved, at least during the passage of the conveyer band over the suction box or boxes.

The construction just described provides an absolutely reliable and simple arrangement by which the filter medium encloses the filter cake laterally and prevents any possibility of its escape to the suction boxes between the filter medium and the intermediate or conveyor band, more particularly as the tension caused by formation of the troughed cross section presses the several belts tightly against one another and thus produces a particularly effective packing.

The troughing effect referred to above, which takes place at least for the distance of travel over the suction boxes, may be most simply achieved by the provision of suitable guide means, which may comprise rollers, guide bars or the like, and preferably by being suitably graduated or stepped are arranged to present a smooth transition from the troughed cross section to the flat cross section which is requisite for the guide drums.

A particularly suitable arrangement according to the invention is one in which the upstanding reinforcing edges of the conveyor belt are each provided with one or more grooves which preferably extend the entire length of the edge and also preferably increase in cross section inwardly. The marginal portions of the filter medium, for example the filter cloth, may be secured in these grooves, and to ensure the cloth being held in proper position I may provide clamping means such as rubber wedges, wooden plugs or the like which are wedged at intervals in the grooves after the marginal portion of the cloth has been inserted therein. This additional precaution is particularly advantageous for preventing loosening of the filter medium from the intermediate or conveyor band at that part of the apparatus in which the conveyor band is above the filter medium.

To further increase the tensioning and packing effect resulting from the troughed cross section of the conveyor band, it is desirable to provide the inside of the permeable intermediate belt, which may for example consist of a perforated rubber web, with solid marginal flanges which, at least during the troughing of the conveyor belt, closely engage the lateral inner surfaces of the upstanding reinforcing edges of this band.

The invention illustratively exemplified in the accompanying drawing, in which

Figure 1 is a side elevation of one form of the apparatus;

Figure 2 is a cross section thereof on a larger scale, and

Figures 3 and 4 are fragmentary sectional views of modifications.

Referring to the drawing, $a$ is a perforated, endless elastic conveyor band having upstanding edges of the same material, for example rubber, as the band itself. The band travels in a horizontal plane over drums $b$ and $c$, one at least of which is driven. $d$ denotes the suction box, which may be adjustable if desired and has wide supporting ledges over which the belt $a$ glides, so that the band automatically makes a tight contact.

Superimposed on the belt $a$ is a perforated, endless intermediate band $e$. Superimposed on the intermediate band $e$ is a filter cloth $f$ in the form of an endless band. On the surface which faces the conveyor band $a$ the intermediate band $e$ is provided with projections in the form of ribs, bars, buttons or the like, so that between the two bands interstices or chambers are produced which facilitate uniform distribution of the reduced pressure under the filter cloth.

As shown more particularly in Figure 2, the reinforcing edges $g$ of the conveyor belt $a$ are so formed that they extend on the inside to a height which is substantially equal to the thickness of the intermediate belt $e$. Upon the common surface, thus formed, I place the filter cloth $f$ which extends to the outer line of the reinforcing edges $g$.

In the form illustrated, the troughed cross section for the distance of travel over the suction box is effected by guide and are so arranged that before and after passing the suction box they permit the transition of the upwardly bent edges into the horizontal position, whereupon the whole surface of the belts passes over the drums $b$ and $c$.

Figure 2 further shows that the resulting filter cake $i$ is also enclosed laterally by the filter cloth on the stretch of the band above the suction box so that all possibility of escape of the cake to the suction box is prevented. In the transition to the flat or untroughed cross section the filter cloth separates laterally from the filter cake and thus facilitates discharge of the cake at the appropriate drum.

Figure 3 illustrates a particularly suitable construction of the reinforcing edge $g$ and fastening of the filter cloth thereto. In this form of the apparatus the reinforcing edge $g$ is provided with a groove $k$ in which the marginal portion of the filter cloth $f$ of appropriate width, is clamped. Additional security is obtained by insertion of the plug $l$, which may be of rubber or wood, and ensures that the filter cloth is held in its proper position even on the under side of the apparatus.

Figure 4 illustrates a particularly suitable construction of the intermediate band $e$, in that the band is provided at each side with a solid inwardly extending rim $m$ which closely engages the inner surface of the reinforcing edge $g$, particularly during the troughing of the conveyor belt, and thus contributes to the desired packing effect, i. e. to making a tight joint between the two bands.

I claim:

1. A filter apparatus for the purpose specified, comprising a suction box, a perforated conveyor band adapted to travel over said suction box, an intermediate perforated band superimposed on said conveyor band, vacuum distributing chambers between said bands, said conveyor band having upstanding lateral reinforcing edges of a height at least substantially equal to the thickness of said intermediate band whereby the upper surface of said intermediate band and the upper surfaces of said edges lie in a common plane and a filter medium super-imposed on said plane and extending from side to side of said edges.

2. A filter apparatus for the purpose specified, comprising a suction box, a perforated conveyor band adapted to travel over said suction box and having upstanding lateral reinforcing edges provided with grooves therein, an intermediate perforated band superimposed on said conveyor band and of a thickness approximately equal to the height of said edges whereby the upper surface of said intermediate band and the upper surfaces of said edges lie in a common plane and a filter medium superimposed on said intermediate band, said filter medium being wider than said conveyor band and having its edges received in said grooves.

3. A filter apparatus for the purpose specified, comprising a suction box, a perforated conveyor band adapted to travel over said suction box and having upstanding lateral reinforcing edges each provided with a groove throughout its length widening downwardly in cross section, an intermediate perforated band superimposed on said conveyor band and of a thickness approximately equal to the height of said edges whereby the upper surface of said intermediate band and the upper surfaces of said edges lie in a common plane and a filter cloth of greater width than said conveyor belt superimposed on said intermediate band and having its side edges secured in said grooves.

4. A filter apparatus for the purpose specified, comprising a suction box, a porforated conveyor band adapted to travel over said suction box and having upstanding lateral reinforcing edges, an intermediate band superimposed on said conveyor band, said intermediate band having solid lateral marginal portions snugly engaging the inner faces of said reinforcing edges and said intermediate band being of a thickness substantially equal to the height of said reinforcing edges whereby the upper surfaces of said intermediate band and the upper surfaces of said reinforcing edges lie in a common plane, vacuum distributing chambers between said bands, and a filter cloth superimposed on said plane and extending from side to side of said edges.

5. A filter apparatus for the purpose specified, comprising a suction box, a perforated conveyor band adapted to travel over said suction box and having upstanding lateral reinforcing edges each provided with a groove throughout its length widening downwardly in cross section, an intermediate perforated band superimposed on said conveyor band and of a thickness approximately equal to the height of said edges whereby the upper surface of said intermediate band and the upper surfaces of said edges lie in a common plane, a filter cloth of greater width than said conveyor belt superimposed on said intermediate band with its side edges projecting into said grooves, and means to trough said bands and filter cloth during their passage over said suction box.

GEORGES LOUIS DESIRÉ CARTIGNY.